United States Patent
Hwang et al.

(10) Patent No.: US 8,717,482 B2
(45) Date of Patent: May 6, 2014

(54) LENS ASSEMBLY WITH AN IMAGE SENSOR BACKOFF MECHANISM

(75) Inventors: Duen-Kwei Hwang, Changhua (TW); Kai-Kun Chen, Changhua (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 13/431,719

(22) Filed: Mar. 27, 2012

(65) Prior Publication Data
US 2013/0088631 A1    Apr. 11, 2013

(30) Foreign Application Priority Data
Oct. 7, 2011   (TW) .............................. 100136573 A

(51) Int. Cl.
*H04N 5/225*   (2006.01)
*G03B 17/04*   (2006.01)

(52) U.S. Cl.
USPC ............ 348/335; 348/373; 348/374; 396/348

(58) Field of Classification Search
USPC ............ 396/241, 64, 75, 245, 257–262, 270, 396/349, 458–461, 505–510, 529; 352/142; 348/335, 340, 373, 374, 208.11, 348/208.12
See application file for complete search history.

(56) References Cited

U.S. PATENT DOCUMENTS

| | | | |
|---|---|---|---|
| 6,366,323 B1 * | 4/2002 | Shono | 348/340 |
| 7,025,512 B2 * | 4/2006 | Nomura | 396/349 |
| 8,251,595 B2 * | 8/2012 | Koyama | 396/349 |
| 2005/0168846 A1 * | 8/2005 | Ye et al. | 359/819 |
| 2006/0146298 A1 * | 7/2006 | Lin | 353/101 |
| 2008/0024650 A1 * | 1/2008 | Nomura et al. | 348/348 |
| 2009/0252488 A1 * | 10/2009 | Eromaki et al. | 396/529 |
| 2010/0110270 A1 * | 5/2010 | Sekimoto et al. | 348/340 |
| 2011/0234803 A1 * | 9/2011 | Nakajima et al. | 348/148 |
| 2011/0235190 A1 * | 9/2011 | Kudoh | 359/704 |

FOREIGN PATENT DOCUMENTS

TW   200848788 A   12/2008

* cited by examiner

*Primary Examiner* — Nhan T Tran
*Assistant Examiner* — Xi Wang
(74) *Attorney, Agent, or Firm* — Muncy, Geissler, Olds & Lowe, P.C.

(57) ABSTRACT

A lens assembly includes a base frame, an image sensor, a lens barrel, a lens and a backoff mechanism. By means of the backoff mechanism, the image sensor is mounted at the base frame and movable between an operative position and a non-operative backoff position. When the image sensor is in the operative position, the lens barrel is in a first position far frame the base frame, and the optical axis of the lens intersects the image sensor. When the lens barrel is moved to a second position close to the base frame, the image sensor is moved to the non-operative backoff position, and the optical axis of the lens is not intersected with the image sensor.

5 Claims, 5 Drawing Sheets

US 8,717,482 B2

LENS ASSEMBLY WITH AN IMAGE SENSOR BACKOFF MECHANISM

BACKGROUND OF THE INVENTION

1. Field of the Invention

The present invention relates to camera lens technology and more particularly, to a lens assembly for camera, which uses a backoff mechanism to move the image sensor away from the optical axis of the lens when the lens is retracted, so that the thickness of the retracted condition of the lens assembly can be minimized.

2. Description of the Related Art

The lens assemblies of regular cameras commonly adopt a retractable design. Thus, the lens barrel that holds a set of lenses can be extended out of the camera housing when taking a picture, or received inside the camera housing when not to take pictures. When retracting the lens assembly, the lenses and optical components in the lens barrel are moved straightly along the optical axis of the lenses toward the image sensor (such as charge coupled device, or CCD) in the camera housing. After retraction, the lenses, the optical components and the image sensor are stacked up. Thus, the thickness of the camera housing must be greater than the combined thickness of the stacked component parts. In consequence, a camera of this design cannot be made thinner.

There are commercial cameras with a lens backoff design. For example, Taiwan Patent 1341926 discloses a design to move one lens set to a position at one side of the image sensor when the lens assembly is retracted, thereby shortening the thickness of the retracted condition of the lens assembly. Thus, the thickness of the housing of the camera using the lens assembly can be greatly reduced. However, as the lens sets must be moved axially and radially during retraction of the lens assembly, the structure of the lens assembly is complicated, not convenient to fabricate or to assemble. Therefore, an improvement in this regard is necessary.

SUMMARY OF THE INVENTION

The present invention has been accomplished under the circumstances in view. It is the main object of the present invention to provide a lens assembly, which enables the camera to reduce the thickness. It is another object of the present invention to provide a lens assembly, which has a simple structure and is easy to make and to assemble.

To achieve this and other objects of the present invention, a lens assembly comprises a base frame, an image sensor, a lens barrel and a lens. The lens barrel is movable to carry the lens along an optical axis of the lens in direction from a first position far from the base frame to a second position close to the base frame. The lens assembly further comprises a backoff mechanism mounted at the base frame and adapted for moving the image sensor between an operative position and a non-operative backoff position. When the image sensor is in the operative position, the lens barrel is in the first position and the optical axis of the lens intersects the image sensor. When the image sensor is in the non-operative backoff position, the image sensor is kept away from the optical axis of the lens.

The lens assembly is mounted inside the camera housing by means of the base frame. When retracting the lens assembly, the lens barrel is moved from the first position to the second position, and at the same time, the image sensor is moved to the non-operative backoff position. Thus, the lens can be carried by the lens barrel to the operative position of the image sensor or over the operative position of the image sensor to a position relatively closer to the base frame when the lens assembly is retracted. Thus, the thickness of the lens assembly can be greatly reduced when it is retracted. Thus, a camera using this design of lens assembly has a low profile characteristic. Further, because the lens and the image sensor are movable straightly back and forth, the lens assembly has a simple structure, facilitating fabrication and assembly.

Other advantages and features of the present invention will be fully understood by reference to the following specification in conjunction with the accompanying drawings, in which like reference signs denote like components of structure.

DETAILED DESCRIPTION OF THE INVENTION

Figure 1:
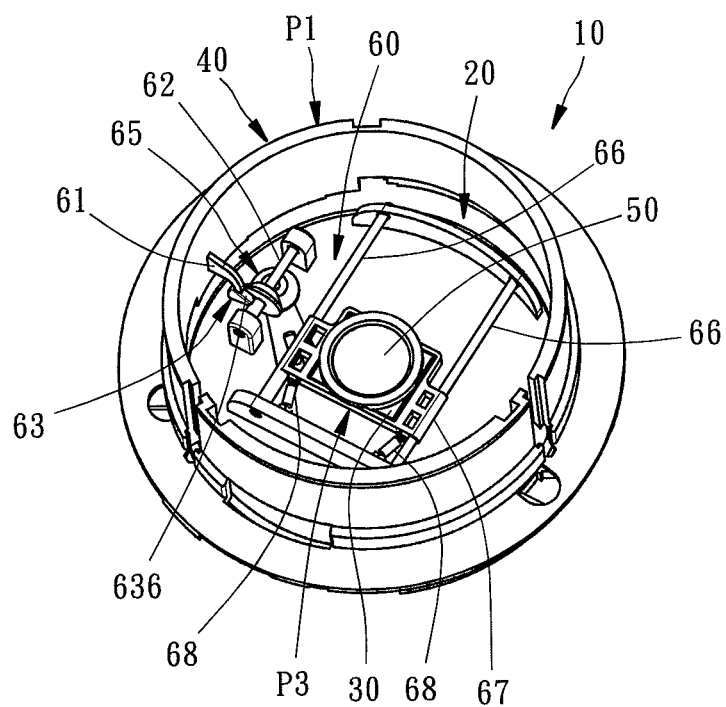
FIG. 1 is an oblique elevational view of a lens assembly for camera in accordance with a first embodiment of the present invention, illustrating an image sensor in an operative position.
Figure 2:
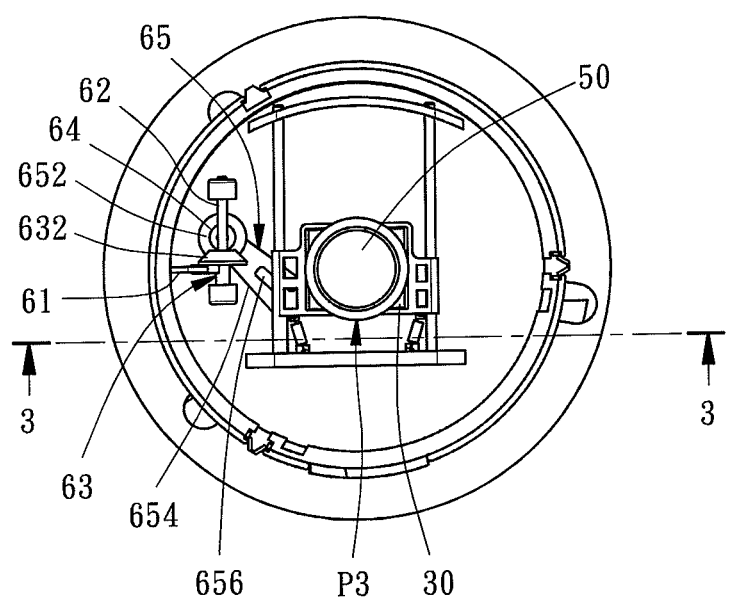
FIG. 2 is a top view of the lens assembly shown in FIG. 1.
Figure 3:
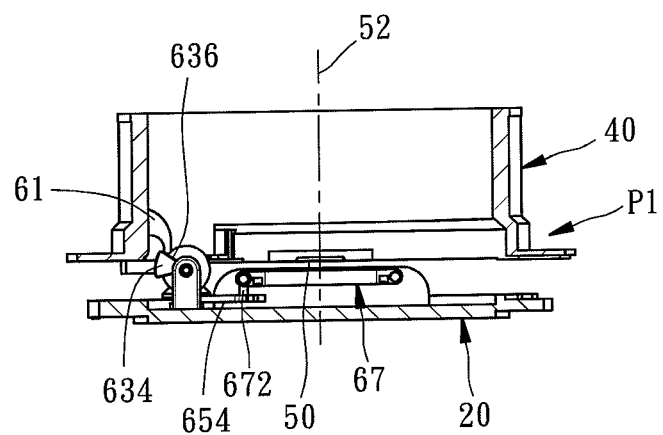
FIG. 3 is a sectional view taken along line 3-3 of FIG. 1.

Referring to FIGS. 1-3, a lens assembly 10 in accordance with a first embodiment of the present invention is shown comprising a base frame 20, an image sensor 30, a lens barrel 40, a lens 50 and a backoff mechanism 60.

The base frame 20 is adapted for mounting in a camera housing (not shown). The image sensor 30 is mounted at the base frame 20 by means of the backoff mechanism 60. The lens 50 is mounted in the lens barrel 40. The lens barrel 40 is moved to a first position P1 far from the base frame 20 (see FIGS. 1-3) when the camera initiates the lens assembly 10. When the camera shuts off the lens assembly 10, the lens barrel 40 is moved from the first position P1 to a second position P2 close to the base frame 20 (see FIGS. 4-6), carrying the lens 50 along an optical axis 52 toward the base frame 20.

The lens barrel 40 may be designed to hold more lenses, lens fixtures and other optical components. Further, as the arrangement and movement of the lens barrel 40 are of the known art, no further detailed description in this regard is necessary. The additional component parts are not illustrated in the drawings, facilitating explanation of the technical features of the present invention.

Figure 4:
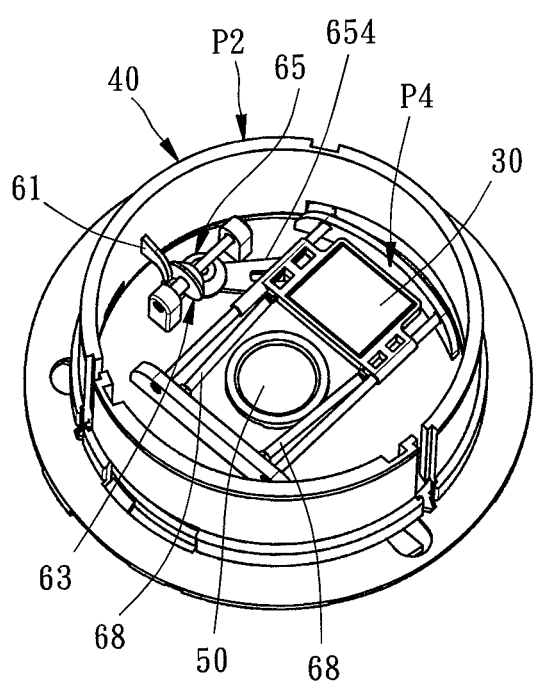
FIG. 4 corresponds to FIG. 1, illustrating the image sensor in a non-operative backoff position.
Figure 5:
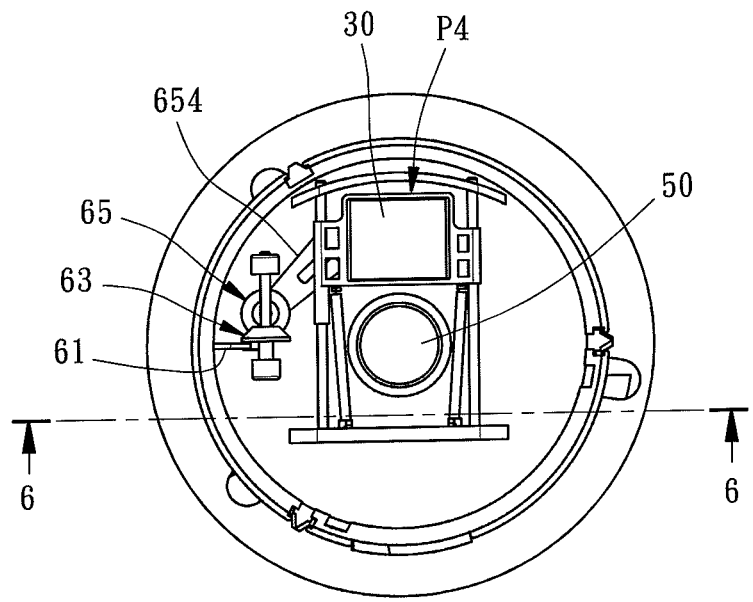
FIG. 5 is a top view of the lens assembly shown in FIG. 4.
Figure 6:
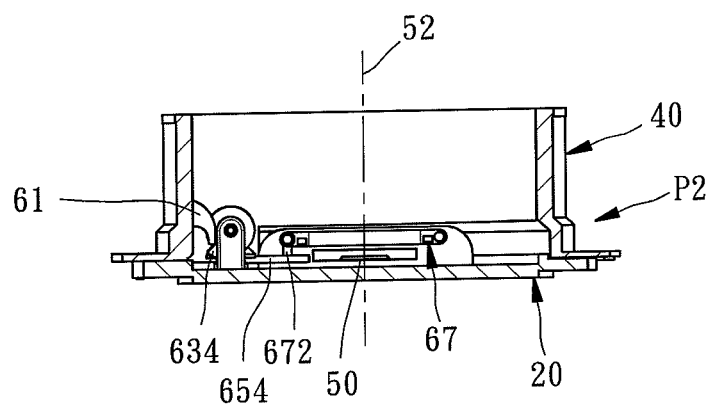
FIG. 6 is a sectional view taken along line 6-6 of FIG. 4.

The main feature of the present invention is that, by means of the backoff mechanism 60, the image sensor 30 is mounted at the base frame 20 and movable between an operative position P3 and a non-operative backoff position P4. As shown in FIGS. 1-3, when the image sensor 30 is in the operative position P3, the lens barrel 40 is in the first position P1, and the optical axis 52 of the lens 50 is intersected with the image sensor 30. As shown in FIGS. 4-6, when the image sensor 30 is in the non-operative position P4, the lens barrel 40 is in the second position P2, and the image sensor 50 is kept away from the optical axis 52 of the lens 50.

In this embodiment, the backoff mechanism 60 comprises a bump 61, a first shaft 62, a first rotating member 63, a second shaft 64, a second rotating member 65, two guide rods 66, a holder plate 67, and two spring members 68.

The bump 61 is fixedly located on the inside wall of the lens barrel 40. Further, the bump 61 can be formed integral with the lens barrel 40. The first shaft 62 is fixedly mounted at the base frame 20 in a perpendicular manner relative to the optical axis 52. The first rotating member 63 is rotatably mounted on the first shaft 62. The second shaft 64 is fixedly located on the base frame 20 in a parallel manner relative to the optical axis 52. The second rotating member 65 is rotatably mounted on the second shaft 64. The two guide rods 66 are fixedly mounted at the base frame 20 in a parallel manner relative to the optical axis 52. The holder plate 67 is slidably mounted on the two guide rods 66. The image sensor 30 is fixedly located on the holder plate 67. The two spring members 68 are tensile springs connected between the base frame 20 and the holder plate 67.

It is to be noted that, the aforesaid first shaft 62 and guide rods 66 are arranged perpendicular to the optical axis 52 without intersecting the optical axis 52, however the aforesaid first shaft 62 and guide rods 66 can be moved to cut through the optical axis 52 at 90-degrees angle.

The first rotating member 63 comprises a first toothed portion 632 shaped like a bevel gear, and a first connection portion 634 shaped like a triangular prism. The first connection portion 634 has an abutment face 636 facing toward the bump 61. When the lens barrel 40 is in the first position P1, the abutment face 636 slopes outwardly from the first shaft 62 toward a direction away from the base frame 20.

The second rotating member 65 comprises a second toothed portion 652 shaped like a bevel gear and meshed with the first toothed portion 632, and a second connection portion 654 shaped like an elongated plate. The second connection portion 654 has an elongated slot 656. The holder plate 67 has a coupling portion 672 extends through the elongated slot 656 toward the base frame 20 (see FIG. 3).

When the lens barrel 40 is moved from the first position P1 to the second position P2, the bump 61 is forced to push the first connection portion 634 of the first rotating member 63 toward the base frame 20, thereby turning the first rotating member 63 about the first shaft 62 and simultaneously moving the second rotating member 65 to turn about the second shaft 64 and to further forcing the holder plate 67 to move along the guide rods 66, and therefore the image sensor 30 is moved from the operative position P3 to the non-operative backoff position P4. When the lens barrel 40 is moved from the second position P2 to the first position P1, the bump 61 is no longer push the first connection portion 634 toward the base frame 20. The two spring members 68 provide a elastic restoring force to push the holder plate 67 and return said image sensor back to said operative position P3.

It is to be noted that the function of the backoff mechanism 60 for moving the image sensor 30 back to the operative position P3 is not limited to the use of the two spring members 68. Other means for enabling the holder plate 67 and the first rotating member 63 or second rotating member 65 to move or to rotate reversely can be used as substitutes. For example, torsion spring may be used and attached to the first rotating member 63 or second rotating member 65.

Further, when retracting the lens assembly 10, the image sensor 30 is moved to the non-operative backoff position P4. Thus, the lens 50 can be moved to the operative position P3 of the image sensor 30 or over the operative position P3 of the image sensor 3 to a position more closer to the base frame 20 (see FIG. 6). Thus, the lens barrel 40 can be received deeply inside the camera housing when the lens assembly 10 is retracted, shortening the thickness of the retracted condition of the lens assembly 10. Thus, a camera using this design of lens assembly 10 has a low profile characteristic. Further, because the lens assembly 10 has a simple structure, it is easy to fabricate and assemble.

Figure 7:
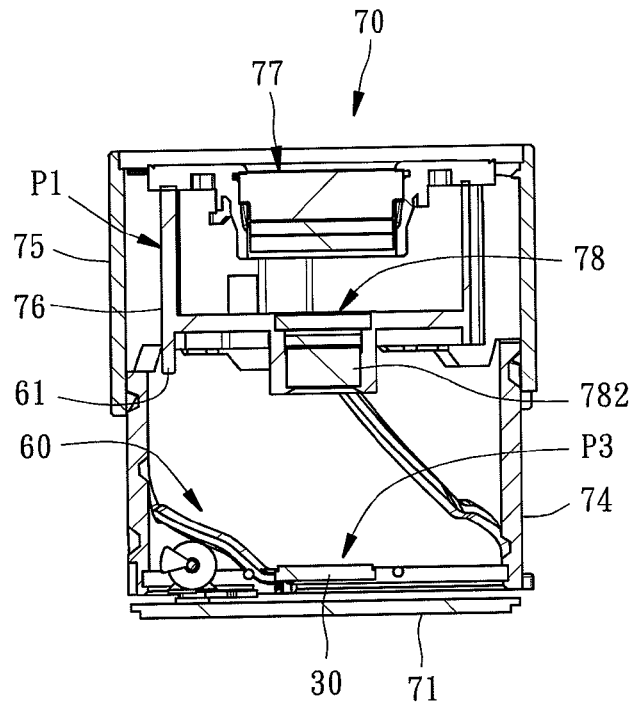
FIG. 7 is a schematic sectional view of a lens assembly for camera in accordance with a second embodiment of the present invention when initiated.
Figure 8:
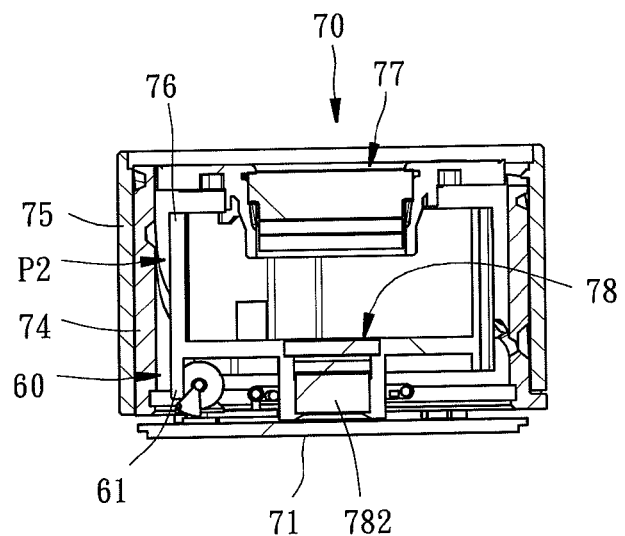
FIG. 8 is a sectional view of the second embodiment of the present invention, illustrating the lens shut-off status.

FIGS. 7 and 8 illustrate a lens assembly 70 in accordance with a second embodiment of the present invention to explain the image sensor 30 movement by means of the backoff mechanism 60.

In the lens assembly 70 of this second embodiment, a rotating barrel 74 is mounted on the base frame, referenced by 71, to move two lens barrels 75 and 76 toward or away from the base frame 71. Further, each lens barrel 75 or 76 holds a respective lens set 77 or 78. The bump 61 of the backoff mechanism 60 in this second embodiment is connected to the bottom side of the lens barrel 76. When the camera shuts off the lens assembly 70, the lens barrel 76 is moved from the first position P1 shown in FIG. 7 to a second position P2 shown in FIG. 8, and at the same time, the image sensor 30 is moved away from the operative position P3 by the backoff mechanism 60. Thus, one lens 782 of the lens set 78 is moved to the operative position P3 of the image sensor 30, reducing the thickness of the retracted condition of the lens assembly 70.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A lens assembly of the type comprising a base frame, an image sensor, a lens barrel and a lens, said lens barrel being movable to carry said lens along an optical axis of said lens in direction from a first position far from said base frame to a second position close to said base frame, the lens assembly further comprising a backoff mechanism mounted at said base frame and adapted for moving said image sensor between an operative position and a non-operative backoff position in such a manner that when said image sensor is in said operative position, said lens barrel is in said first position and said optical axis of said lens intersects said image sensor; when said image sensor is in said non-operative backoff position, said image sensor is kept away from said optical axis of said lens, wherein said backoff mechanism is moved by said lens barrel to move said image sensor from said operative position to said non-operative backoff position when said lens barrel is moved from said first position to said second position, wherein said backoff mechanism comprises a bump mounted at said lens barrel, a first shaft arranged perpendicular to said optical axis, a first rotating member abutted against said bump and movable by said bump to turn around said first shaft, a second shaft arranged in parallel to said optical axis, a second rotating member connected to said first rotating member and movable by said first rotating member to turn around said second shaft, at least one guide rod arranged at said base frame perpendicular to said optical axis, and a holder plate carrying said sensor and coupled to said second rotating member and movable by said second rotating member along said at least one guide rod, and wherein said first rotating member of said backoff mechanism comprises a first toothed portion and a first connection portion abutted against said bump; said second rotating member comprises a second toothed portion meshed with said first toothed portion and a second connection portion connected to said base frame.

2. The lens assembly as claimed in claim 1, wherein said first connection portion of said first rotating member of said backoff mechanism comprises an abutment face abutted against said bump, said abutment face sloping outwardly from said first shaft toward a direction away from said base frame when said lens barrel in said first position.

3. The lens assembly as claimed in claim 1, wherein said second connection portion of said second rotating member of said backoff mechanism comprises an elongated slot; said holder plate comprises a coupling portion extending coupled to said elongated slot of said second connection portion.

4. The lens assembly as claimed in claim 1, wherein said backoff mechanism further comprises a spring member connected between said base frame and said holder plate and adapted to provide an elastic restoring force to return said image sensor back to said operative position.

5. The lens assembly as claimed in claim 1, wherein when said lens barrel is in said second position to let said image sensor be moved to said non-operative backoff position, said lens is kept closer to said base frame than said image sensor.

\* \* \* \* \*